US012559670B2

(12) United States Patent
Kwon et al.

(10) Patent No.: US 12,559,670 B2
(45) Date of Patent: Feb. 24, 2026

(54) QUANTUM DOT MICROCAPSULE AND DISPLAY PANEL INCLUDING THE SAME

(71) Applicant: KOREA ELECTRONICS TECHNOLOGY INSTITUTE, Seongnam-si (KR)

(72) Inventors: Soon Hyung Kwon, Seongnam-si (KR); Kyoung Won Park, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 992 days.

(21) Appl. No.: 17/696,098

(22) Filed: Mar. 16, 2022

(65) Prior Publication Data
US 2022/0298410 A1 Sep. 22, 2022

(30) Foreign Application Priority Data
Mar. 22, 2021 (KR) ......................... 10-2021-0036873

(51) Int. Cl.
| | |
|---|---|
| *C09K 11/02* | (2006.01) |
| *B82Y 20/00* | (2011.01) |
| *B82Y 30/00* | (2011.01) |
| *B82Y 40/00* | (2011.01) |
| *C09K 11/08* | (2006.01) |

(Continued)

(52) U.S. Cl.
CPC ............ *C09K 11/02* (2013.01); *C09K 11/025* (2013.01); *C09K 11/0816* (2013.01); *C09K 11/55* (2013.01); *C09K 11/673* (2013.01); *C09K 11/7718* (2013.01); *B82Y 20/00* (2013.01); *B82Y 30/00* (2013.01); *B82Y 40/00* (2013.01)

(58) Field of Classification Search
CPC ... C09K 11/02; C09K 11/025; C09K 11/7718; C09K 11/673; C09K 11/55; C09K 11/0816
See application file for complete search history.

(56) References Cited

U.S. PATENT DOCUMENTS

2005/0135079 A1* 6/2005 Yin Chua .............. H04N 23/56
362/11
2020/0181436 A1 6/2020 Pschenitzka et al.

FOREIGN PATENT DOCUMENTS

| KR | 10-2014-0042274 A | 4/2014 |
|---|---|---|
| KR | 10-2018-0090954 A | 8/2018 |

(Continued)

OTHER PUBLICATIONS

Korean Office Action issued on Apr. 7, 2025 in corresponding Korean Patent Application No. 10-2021-0036873. (2 pages in English and 6 pages in Korean).

*Primary Examiner* — C Melissa Koslow
(74) *Attorney, Agent, or Firm* — NSIP Law

(57) ABSTRACT

A quantum dot microcapsule according to an embodiment of the present invention includes one or more quantum dots each including a ligand coupled to an outer circumferential surface thereof, the ligand being made of an organic material, and a microcapsule accommodating the one or more quantum dots. The microcapsule includes an oil or a solvent with the quantum dots dispersed therein. There are effects capable of not only effectively adjusting a density of quantum dots through formation of a microcapsule formed to include one or more quantum dots and filled with an oil, but also effectively protecting ligands of the quantum dots from an environment such as oxygen, moisture or the like, against which the ligands are weak.

7 Claims, 18 Drawing Sheets

(51) Int. Cl.
    *C09K 11/55*     (2006.01)
    *C09K 11/67*     (2006.01)
    *C09K 11/77*     (2006.01)

(56)              References Cited

FOREIGN PATENT DOCUMENTS

KR     10-2020-0022325  A     3/2020
WO     WO 2019/065069     *   4/2019

* cited by examiner

Blue Light

QUANTUM DOT MICROCAPSULE AND DISPLAY PANEL INCLUDING THE SAME

CROSS REFERENCE TO RELATED APPLICATION

The present application claims priority to Korean Patent Application No. 10-2021-0036873, filed Mar. 22, 2021, the entire contents of which are incorporated herein for all purposes by this reference.

BACKGROUND OF THE INVENTION

Field of the Invention

The present invention relates to a quantum dot microcapsule and a display panel including the same.

Description of the Related Art

Flat display devices of various types have recently been developed. As such a slim display device, there are a liquid crystal display (LCD) device, a plasma display panel (PDP) device, a field emission display (FED) device, an organic light emitting display (OLED) device, etc. classified in accordance with display panels used therein.

Here, the LCD device uses a non-luminous display panel and, as such, a backlight is essential therein. In the LCD device, realization of an image may be achieved by controlling ON/OFF of light emitted from the backlight through a liquid crystal panel on a pixel basis. For this reason, real black cannot be rendered and, as such, contrast may be degraded. Furthermore, there is a limitation in realizing video of a high picture quality due to slow response time.

Among the above-mentioned devices, the OLED device is a self-luminous device and, as such, does not require a separate light source. As compared to the LCD device, accordingly, the OLED device is excellent in terms of viewing angle and contrast ratio while being advantageous in terms of power consumption. Furthermore, there are advantages in that DC low-voltage driving is possible, and response time is fast.

Currently, active research on a display using a quantum dot is being conducted. A display panel having an excellent color gamut through use of a quantum dot in place of an existing color filter or combination of the quantum dot with a micro-LED or a nano-LED is developed. However, there may be various problems associated with technology for aligning or patterning red, green and blue pixel regions in a divisional manner. For this reason, only an inkjet method involving high cost and great time consumption is applicable. In this case, there is a problem in that a quantum dot material is weak against an exposure environment such as moisture, oxygen or the like because a ligand thereof is formed of an organic material and, as such, has a difficulty in handling.

PRIOR ART LITERATURE

Patent Documents

Patent Document 1: Korean Unexamined Patent Publication No. 10-2014-0042274 A

SUMMARY OF THE INVENTION

Therefore, the present invention has been made in view of the above problems, and it is an object of the present invention to provide a quantum dot microcapsule capable of achieving reliability of light emission by quantum dots and an effective arrangement of the quantum dots on a color basis in a plurality of red, green and blue pixel regions while protecting organic ligands of the quantum dots from an environment such as oxygen, moisture or the like, against which the organic ligands are weak.

It is another object of the present invention to provide a display panel using an arrangement on a color basis of microcapsules each including one or more quantum dots.

In accordance with an aspect of the present invention, the above and other objects can be accomplished by the provision of a quantum dot microcapsule including one or more quantum dots each including a ligand coupled to an outer circumferential surface thereof, the ligand being made of an organic material, and a microcapsule accommodating the one or more quantum dots, wherein the microcapsule includes an oil or a solvent with the quantum dots dispersed therein.

Each of the quantum dots may include a core, a first shell formed to surround the core, a second shell formed to surround the first shell, and the ligand formed at an outer circumferential surface of the second shell.

Each of the quantum dots may be a nanocrystal particle of a perovskite, and the perovskite may be formed of one of $CaTiO_3$, $BaTiO_3$, or a combination thereof.

An outer wall of the microcapsule may be made of a light-transmissive polymer material, and may include one or a combination of two or more of acacia gum, alginate, gelatin, ethyl cellulose, polyamide, melamine formaldehyde, poly(vinyl pyridine), polystyrene, polyurethane and methylmethacrylate.

In accordance with another aspect of the present invention, there is provided a display panel including a base substrate, separators formed on the base substrate to have a predetermined height and configured to define a first pixel region, a second pixel region and a third pixel region respectively formed to emit light of red, green and blue wavelengths in a separated state, while being spaced apart from one another by predetermined distances, wherein, when the predetermined distance between the separators defining the first pixel region is a, the predetermined distance between the separators defining the second pixel region is b, and the predetermined distance between the separators defining the third pixel region is c, the predetermined distances a, b, and c are different from one another, a quantum dot microcapsule of red light having a diameter corresponding to the predetermined distance a is included in the first pixel region, and a quantum dot microcapsule of green light having a diameter corresponding to the predetermined distance b is included in the second pixel region.

The first pixel region may extend in a longitudinal direction while having a width corresponding to the predetermined distance a. The second pixel region may be adjacent to the first pixel region and may extend in a longitudinal direction while having a width corresponding to the predetermined distance b. The third pixel region may be adjacent to the second pixel region and may extend in a longitudinal direction while having a width corresponding to the predetermined distance c. When the predetermined distances a, b, and c have a relation of a>b>c, the second pixel region or the third pixel region may include at least two identical pixel regions.

The first pixel region may be formed to have a form of a lattice having a shorter width a and a longer longitudinal width corresponding to a multiple of a, and may be formed such that the lattice thereof is repeated in a longitudinal direction at least one time. A second pixel region may be formed to be adjacent to the first pixel region while having a form of a lattice having a shorter width b and a longer longitudinal width corresponding to a multiple of b, and may be formed such that the lattice thereof is repeated in a longitudinal direction at least one time. A third pixel region may be formed to be adjacent to the second pixel region while having a form of a lattice having a shorter width c and a longer longitudinal width corresponding to a multiple of c, and may be formed such that the lattice thereof is repeated in a longitudinal direction at least one time. A quantum dot microcapsule of red light having a diameter corresponding to the predetermined distance a may be included in the first pixel region. A quantum dot microcapsule of green light having a diameter corresponding to the predetermined distance b may be included in the second pixel region.

In accordance with a further aspect of the present invention, there is provided a display panel including a base substrate, separators formed on the base substrate to have a predetermined height and configured to define a first pixel region, a second pixel region and a third pixel region respectively formed to emit light of red, green and blue wavelengths in a separated state, while being spaced apart from one another by predetermined distances, wherein the predetermined distance between the separators defining the first pixel region, the predetermined distance between the separators defining the second pixel region, and the predetermined distance between the separators defining the third pixel region are equal to a, wherein an inlet portion formed at one end of the first pixel region has a width a1, an inlet portion formed at one end of the second pixel region has a width a2, and an inlet portion formed at one end of the third pixel region has a width a3, wherein the widths a1, a2 and a3 are different from one another, wherein a quantum dot microcapsule of red light having a diameter corresponding to the width a1 is included in the first pixel region, and wherein a quantum dot microcapsule of green light having a diameter corresponding to the width b1 is included in the second pixel region.

In accordance with a further aspect of the present invention, there is provided a display panel including a base substrate, separators formed on the base substrate to have a predetermined height and configured to define a first pixel region, a second pixel region and a third pixel region respectively formed to emit light of red, green and blue wavelengths in a separated state, while being spaced apart from one another by predetermined distances, wherein the predetermined distance between the separators defining the first pixel region, the predetermined distance between the separators defining the second pixel region, and the predetermined distance between the separators defining the third pixel region are equal to a, and wherein the display panel further includes one or more inner separators formed to protrude toward an inside of each of the pixel regions in a width direction of the pixel region by a length smaller than the predetermined distance a, while being spaced apart from one another by a predetermined distance in a longitudinal direction of the pixel region.

Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for best explanation.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
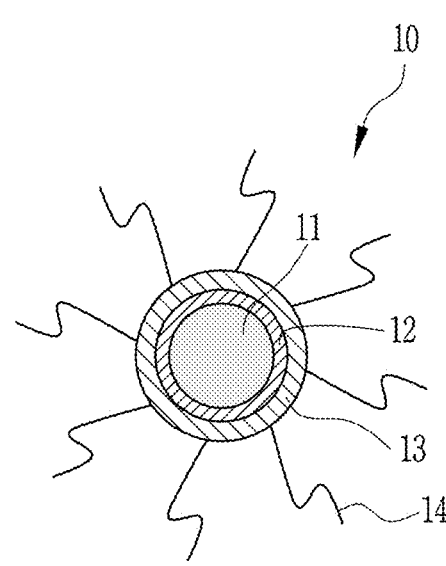
FIG. 1 is a schematic view of a quantum dot according to an embodiment of the present invention.

Objects, particular advantages and new features of the present invention will be more clearly understood from the following detailed description and preferred embodiments taken in conjunction with the accompanying drawings. In the specification, in adding reference numerals for elements in each drawing, it should be noted that like reference numerals already used to denote like elements in other drawings are used for elements wherever possible. In addition, the terms "one surface", "the other surface", "first" and "second" are used to differentiate one constituent element from the other constituent element, and these constituent elements should not be limited by these terms. In the following description, when the detailed description of the relevant known function or configuration is determined to unnecessarily obscure the subject matter of the present invention, such detailed description will be omitted.

Reference will now be made in detail to the preferred embodiments of the present invention, examples of which are illustrated in the accompanying drawings. Wherever possible, the same reference numbers will be used throughout the drawings to refer to the same or like parts.

Figure 2:
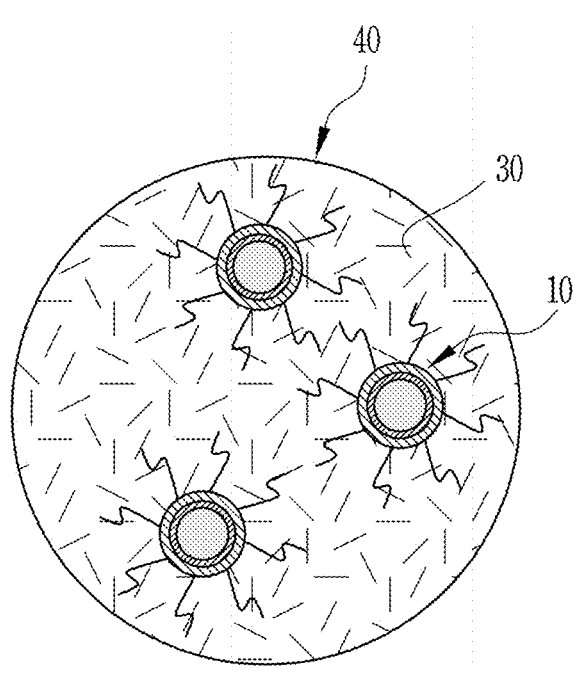
FIG. 2 is a schematic view of a microcapsule including the quantum dot according to an embodiment of the present invention.
Figure 3:
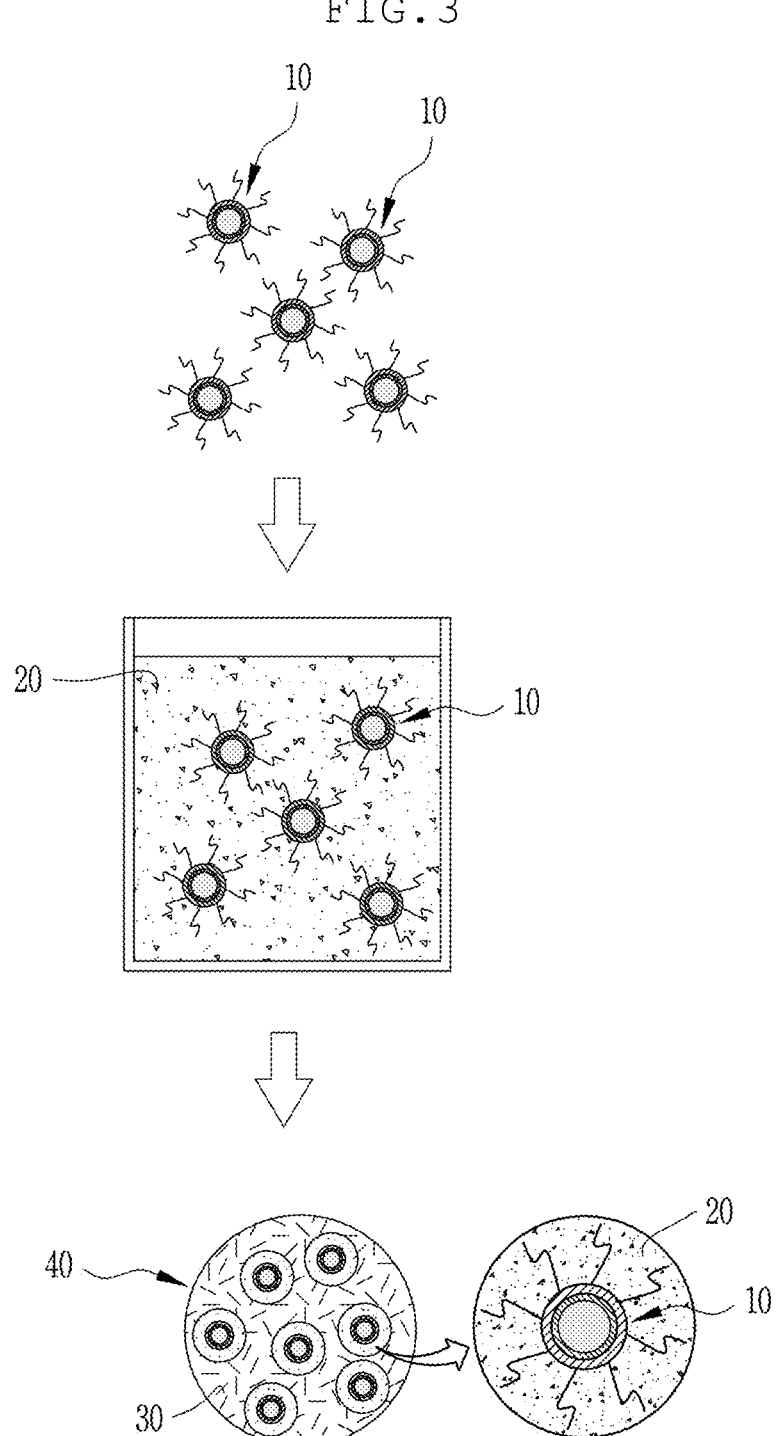
FIG. 3 is a schematic view of a formation procedure of the microcapsule including the quantum dot according to an embodiment of the present invention.

FIG. 1 is a schematic view of a quantum dot 10 according to an embodiment of the present invention. FIG. 2 is a schematic view of a microcapsule 40 including the quantum dot 10 according to an embodiment of the present invention. FIG. 3 is a schematic view of a formation procedure of the microcapsule 40 including the quantum dot 10 according to an embodiment of the present invention.

A quantum dot microcapsule according to an embodiment of the present invention includes one or more quantum dots 10 each including a ligand made of an organic material and coupled to an outer circumferential surface thereof, and a microcapsule 40 accommodating the one or more quantum dots 10. The microcapsule 40 includes an oil 30 or a solvent 20 in which the quantum dots 10 are dispersed.

When a particle is reduced in size to a level of several nanometers, electrooptical properties thereof may be greatly varied. Such an ultrafine semiconductor nanoparticle is referred to as a "quantum dot (QD)". When electricity is applied to or light is irradiated onto a quantum dot, which may have various shapes, the quantum dot may emit light of a particular frequency in accordance with the size, shape and material thereof. As such, it may be possible to render light emission colors of various ranges and to reduce power consumption. In the following description given in conjunction with embodiments of the present invention, such a quantum dot will be collectively referred to as a "quantum dot 10".

Although a display panel using such characteristics of the quantum dot 10 may be realized, there may be problems in that a ligand 14 made of an organic material and coupled to an outer circumferential surface of the quantum dot 10 is weak, the quantum dot 10 may have a difficulty in selective arrangement thereof on the display panel (that is, a difficulty in application of a photolithography process or the like), and use of the quantum dot 10 in a liquid phase state may be difficult when the quantum dot 10 is used through printing thereof on a film and, as such, it may be difficult to stably achieve high definition of light emission colors.

In an embodiment of the present invention, the quantum dot 10 may be utilized in a general display in order to render red, green or colors of other wavelengths in the display. A ligand 14 is coupled to the outer circumferential surface of the quantum dot 10 such that quantum dots 10 are formed on a base substrate 50 in a uniformly dispersed state. By the ligand 14, it may be possible to not only maintain a distance between the quantum dots 10, but also to more stably maintain various energy variations, etc. between the quantum dots 10 according to a substantial variation in wavelength caused by the quantum dots 10.

Since such a ligand 14 is weak against oxygen or moisture in air, design of an additional protective material or structure through formation of a separate protective layer or the like on a display panel formed using quantum dots 10 is essential in order to protect the ligand 14.

The quantum dot microcapsule according to the embodiment of the present invention may be configured to not only maintain characteristics of the quantum dot 10 described above, but also to stably protect the ligand 14 of the quantum dot 10 and to enable the ligand 14 to maximally exhibit the function thereof.

Although the shape of the microcapsule 40 is not limited to a particular shape, the microcapsule 40 may have a circular shape due to a manufacturing method thereof, and may be manufactured to include at least one quantum dot 10 in a manufacturing process thereof.

An outer wall of the microcapsule 40 may be formed using an isoelectric point by a coacervation microencapsulation method, without being limited thereto. The capsule outer wall may be formed by a method such as emulsion polymerization, multi-emulsion polymerization, condensation polymerization, solvent extraction and evaporation, suspension crosslinking, coacervation, extrusion, splaying, or the like.

The outer wall of the microcapsule 40 may be made of a light-transmissive polymer material, and may include one or a combination of two or more of acacia gum, alginate, gelatin, ethyl cellulose, polyamide, melamine formaldehyde, poly(vinyl pyridine), polystyrene, polyurethane and methylmethacrylate.

By the above-described microcapsule 40, it may be possible to enable the quantum dot 10 accommodated in the microcapsule 40 to exhibit a light emission effect. In addition, it may be possible to effectively cope with structures and characteristics of various display panels through realization of the microcapsule 40 with various sizes.

The microcapsule 40 is formed to accommodate the quantum dot 10, and the oil 30 may fill an inner space of the microcapsule 40 in which the quantum dot 10 is accommodated. The oil 30 may effectively isolate and protect the ligand 14 of the quantum dot 10 from moisture. In addition, the quantum dot 10 may be embodied on a microcapsule basis and, as such, a liquid phase state of the quantum dot 10 may be maintained, and a light emission effect by the quantum dot 10 may be achieved without a separate protective layer.

The quantum dot 10 may be formed to have a single layer or may be formed to have a core-shell structure, as shown in FIG. 1. The quantum dot 10 may include at least one shell structure through, for example, sequential formation of a first shell 12 and a second shell 13 around a core 11. The ligand 14 may be attached to an outermost one of the shells.

In the quantum dot 10 having the core-shell structure, it may be possible to grow a shell layer such that the shell layer has various forms by adding different ingredients upon growing a crystal structure of the core. In the case in which a core-cell structure is formed, there are advantages in that it may be possible to not only satisfy characteristics such as high luminous efficacy, high luminous definition or the like, but also to satisfy other characteristics such as optical stability or the like. The quantum dot 10, which has such a core-shell structure or an alloy structure, may be CdSe/ZnS, CdSe/ZnSe/ZnS, CdSe/CdS$_x$(Zn$_{1-y}$Cd$_y$)S/ZnS, CdSe/CdS/ZnCdS/ZnS, InP/ZnS, InP/Ga/ZnS, InP/ZnSe/ZnS, PbSe/PbS, CdSe/CdS, CdSe/CdS/ZnS, CdTe/CdS, CdTe/ZnS, CuInS$_2$/ZnS, or Cu$_2$SnS$_3$/ZnS.

As described above, the ligand 14 may not only function to disperse quantum dots 10, but also may maintain a physical distance between the quantum dots 10 enabling the quantum dots 10 to exhibit a more stable and effective light emission effect.

The quantum dot 10 may include one of an Si-based nano crystal, a group II-VI compound semiconductor nano crystal, a group III-V compound semiconductor nano crystal, a group IV-VI compound nano crystal and a mixture thereof.

The group II-VI compound semiconductor nano crystal may be one selected from the group consisting of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe, and HgZnSTe. The group III-V compound semiconductor nano crystal may be one selected from the group consisting of GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaIn-PAs, InAlNP, InAlNAs, and InAlPAs. The group IV-VI compound nano crystal may be SbTe.

In addition, the quantum dot 10 may be capped by a capping layer. The capping layer may be a layer of the ligand 14 coordinated to a surface of the quantum dot 10, and may prevent aggregation of quantum dots 10 in a solvent 20 during production of a quantum dot dispersion solution. The capping layer may be a layer of a material selected from the group consisting of phosphine oxide having a long-chain alkyl or aryl group exhibiting non-polarity, organic amine, organic acid, phosphine acid, and combinations thereof. For example, the capping layer may be a layer of a material selected from the group consisting of tri-n-octylphosphine oxide (TOPO), stearic acid, palmitic acid, octadecylamine, hexadecylamine, dodecylamine, lauric acid, oleic acid, hexyl phosphonic acid, and combinations thereof.

In accordance with an embodiment of the present invention, the quantum dot 10 may include a nanocrystal particle of a perovskite. A material of the perovskite may be $CaTiO_3$, $BaTiO_3$, or a combination thereof.

Even in the case of a perovskite quantum dot, an organic ligand is needed for synthesis of the quantum dot, and may perform various functions, for example, a function for achieving effective quantum dot dispersion, a function for enhancing stability of the quantum dot, a function for protecting a core from strong ultraviolet light, etc. The organic ligand may also perform an effective function for defect control for the perovskite quantum dot with many surface defects. As such, necessity to protect such a ligand is also high. In this regard, the quantum dot 10 according to the embodiment of the present invention may be a perovskite quantum dot.

In detail, the perovskite may be a nanocrystal particle. The perovskite may be a structure of $ABX_3$, $A_2BX_4$, $ABX_4$ or $A_{n-1}B_nX_{3n+1}$ (n being an integer of 2 to 6), wherein A is organic ammonium or an alkali metal material, B is a metal material, and X is a halogen element.

In addition, the quantum dot 10 may be a doped perovskite nanocrystal particle. The doped perovskite may be characterized in that the doped perovskite includes a structure of $ABX_3$, $A_2BX_4$, $ABX_4$ or $A_{n-1}B_nX_{3n+1}$ (n being an integer of 2 to 6), wherein a part of A is substituted by A', a part of B is substituted by B', or a part of X is substituted by X', and wherein A and A' are organic ammonium, B and B' are metal materials, and X and X' are halogen elements.

As shown in FIG. 3, the quantum dot 10, which is dispersed in the solvent 20, may be produced in the form of the microcapsule 40, to have a liquid phase state. As the quantum dot 10 is dispersed within the microcapsule 40, together with the oil 30, the quantum dot 10 may be formed to have a liquid phase. When the solvent 20 is not intimate with the oil 30, the solvent 20 may be present within the microcapsule 40, together with the oil 30, in a state of being coupled to the ligand 14 of the quantum dot 10. On the other hand, when the solvent 20 is intimate with the oil 30, the solvent 20 may be present within the microcapsule 40, mixed state with the oil 30, and, as such, may perform dispersion maintenance for the quantum dot 10 and stable protection of the ligand 14.

The solvent 20 may be supplied in a state of a colloid (or a dispersed solution) dispersed in benzene, xylene, toluene, cyclohexane, or carbon tetrachloride, without being limited thereto.

Figure 4:
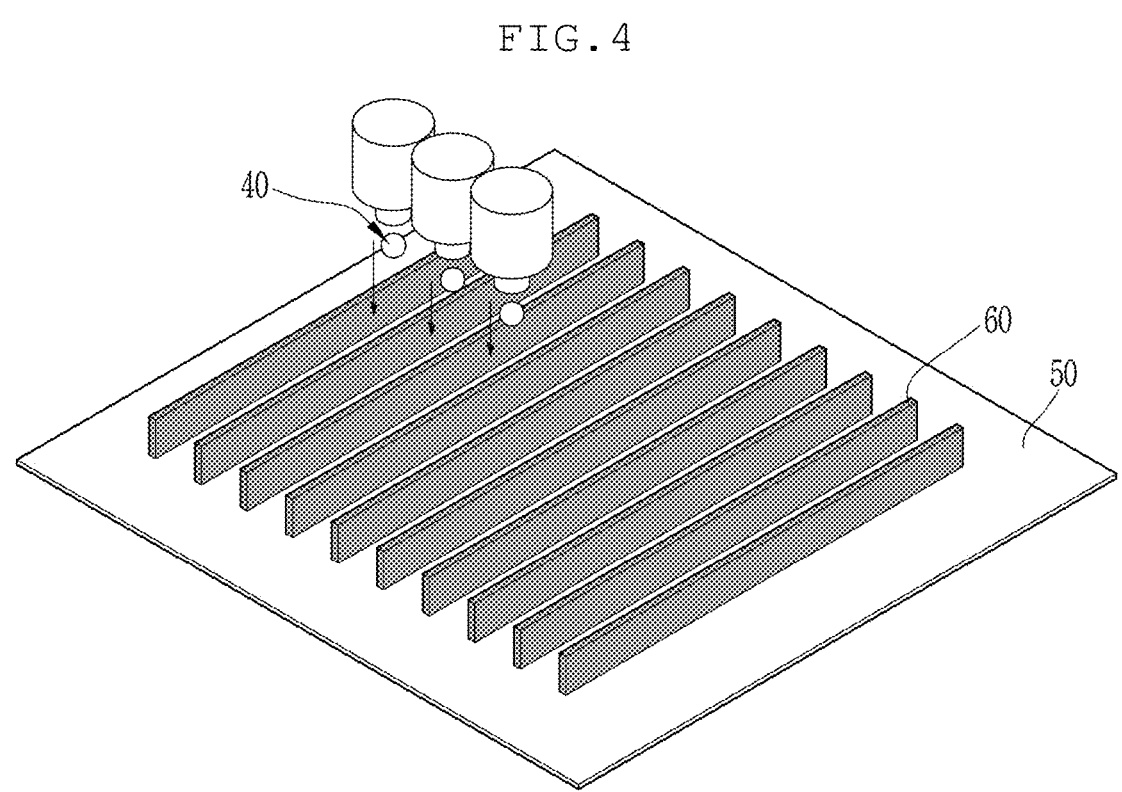
FIG. 4 is a schematic view of an example in which a microcapsule is injected into a display panel in accordance with an embodiment of the present invention.
Figure 5:
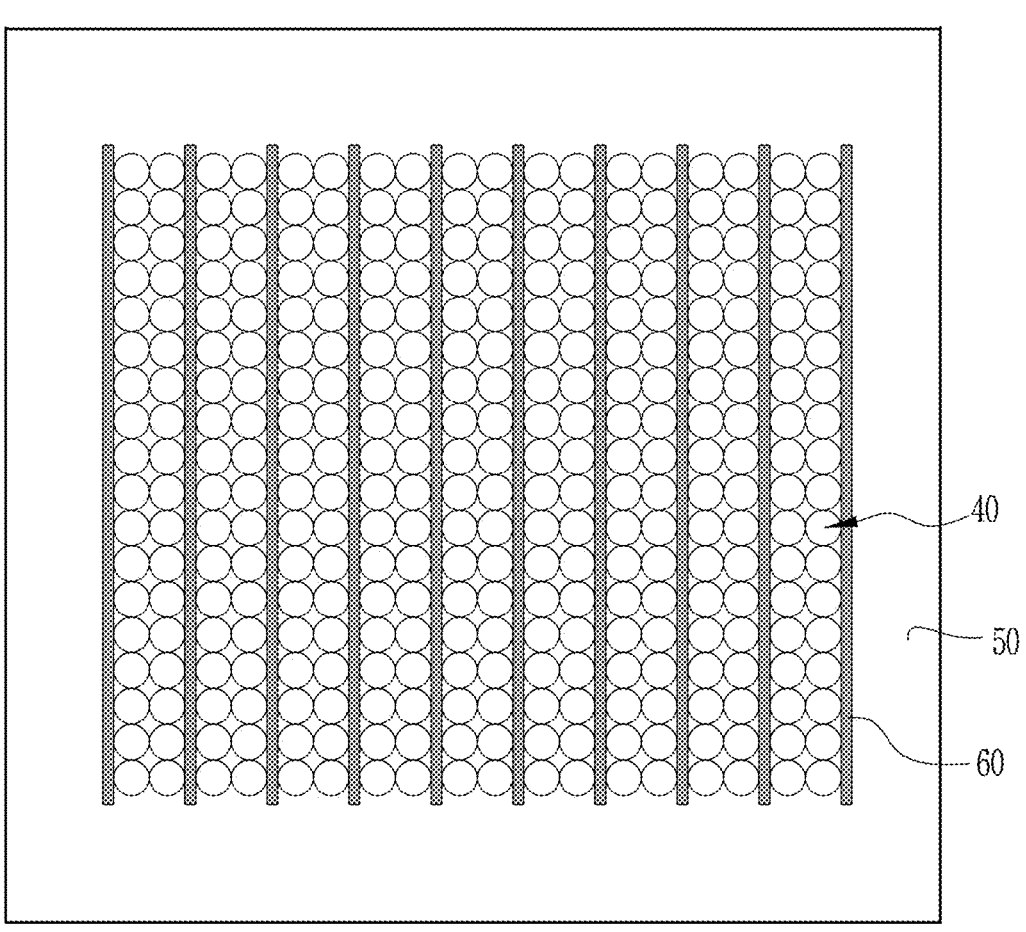
FIG. 5 is a plan view of a display panel including a first pixel region, a second pixel region and a third pixel region in which quantum dot microcapsules according to an embodiment of the present invention are included.
Figure 6:
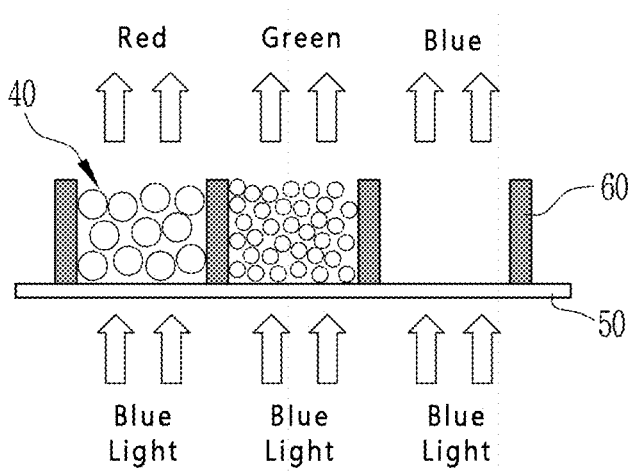
FIG. 6 is a schematic sectional view of a configuration according to the embodiment of FIG. 5.
Figure 7:
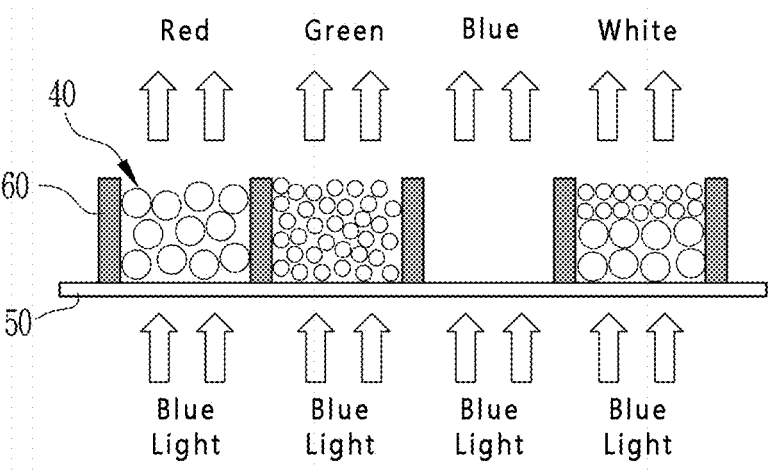
FIGS. 7 and 8 are schematic sectional views of configurations according to embodiments modified from the embodiment of FIG. 5 in which white light is included, respectively.
Figure 8:
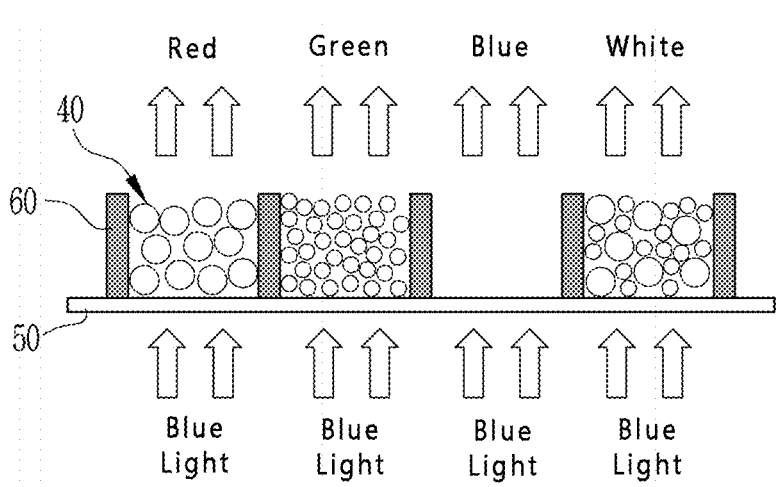
Figure 9:
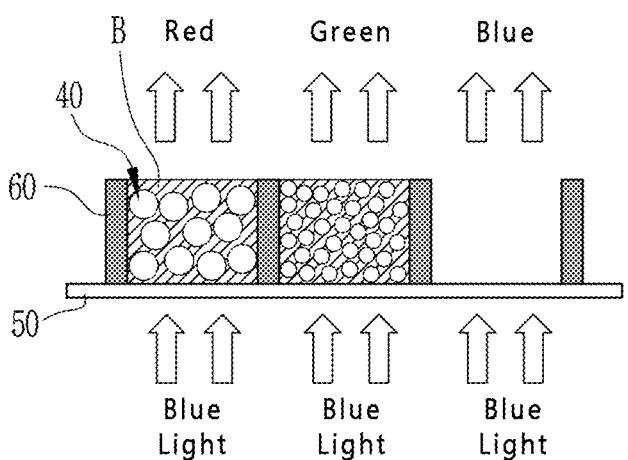
FIG. 9 is a schematic sectional view of a configuration according to an embodiment modified from the embodiment of FIG. 5 in which a binder is included.

FIG. 4 is a schematic view of an example in which a microcapsule is injected into a display panel in accordance with an embodiment of the present invention. FIG. 5 is a plan view of a display panel including a first pixel region, a second pixel region and a third pixel region in which quantum dot microcapsules according to an embodiment of the present invention are included. FIG. 6 is a schematic sectional view of a configuration according to the embodiment of FIG. 5. FIGS. 7 and 8 are schematic sectional views of configurations according to embodiments modified from the embodiment of FIG. 5 in which white light is included, respectively. FIG. 9 is a schematic sectional view of a configuration according to an embodiment modified from the embodiment of FIG. 5 in which a binder is included.

As shown in FIG. 4, a quantum dot microcapsule may be injected into each pixel region through an inkjet method, for a color arrangement of a display panel. In such a manner, a quantum dot microcapsule meeting a color arrangement may be injected into each pixel region of a general display panel, as shown in FIG. 5.

As shown in FIG. 6, a quantum dot may be injected in the form of a microcapsule and, as such, a display panel may be realized through the quantum dot injected into each color region in the form of the microcapsule.

In each case of FIGS. 7 and 8, a pixel region rendering white is further included. In this case, hetero quantum dots respectively rendering different colors are embodied in the form of microcapsules and, as such, different separated colors in a liquid phase state may be effectively realized. Accordingly, rendering of various colors may be achieved.

Quantum dot microcapsules may be injected in a stacked state or in a mixed state in accordance with the size thereof. Various arrangements or a mixed structure of quantum dots may be stably embodied through a form of microcapsules.

FIG. 9 is a schematic sectional view of a configuration in which a binder is further included in a space among microcapsules included in each pixel region. In this case, there are advantages in that quantum dot microcapsules included in a pixel region are stably disposed through the binder, and the binder stably fills a fine space among the microcapsules and, as such, structural stability may be secured.

As quantum dot microcapsules embodied as described above are used in a display panel, there are advantages in that various colors may be rendered, and quantum dots may be effectively maintained in a liquid phase state in which the quantum dots may render more stable and distinct colors.

Figure 10:
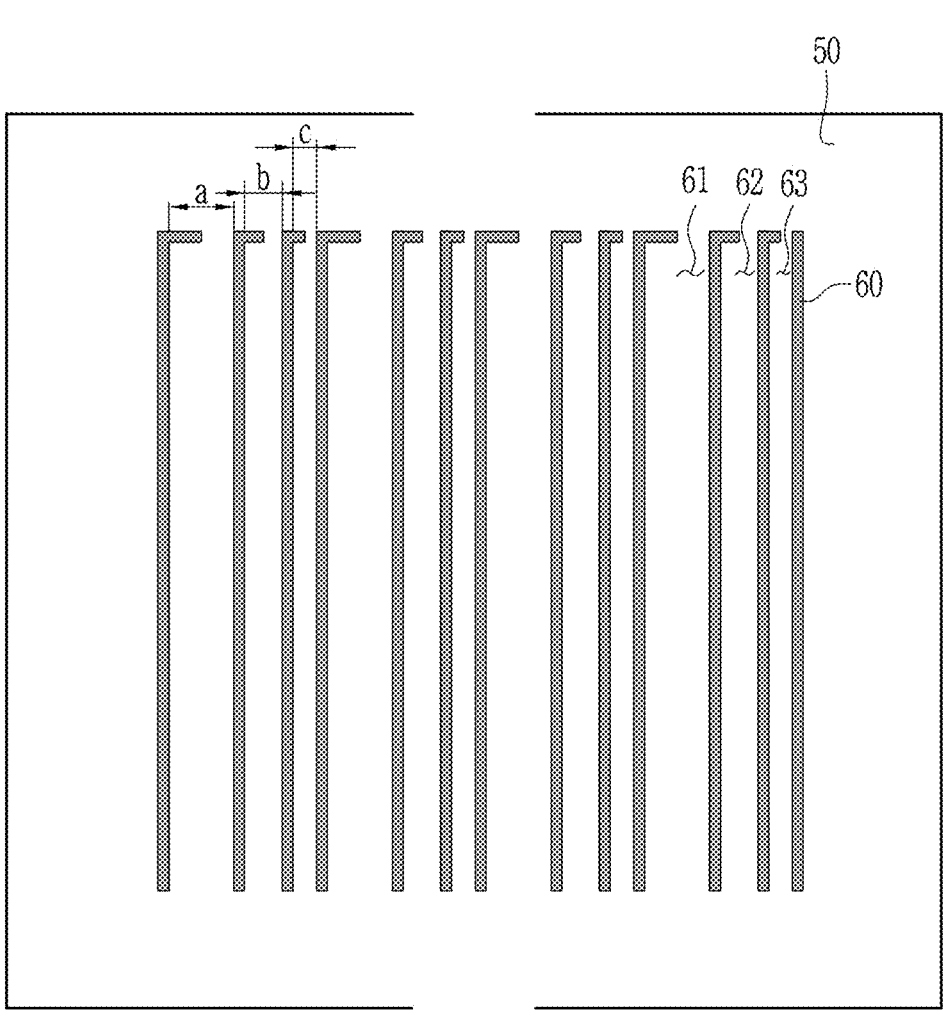
FIG. 10 is a plan view of a display panel including first to third pixel regions according to an embodiment of the present invention.
Figure 11:
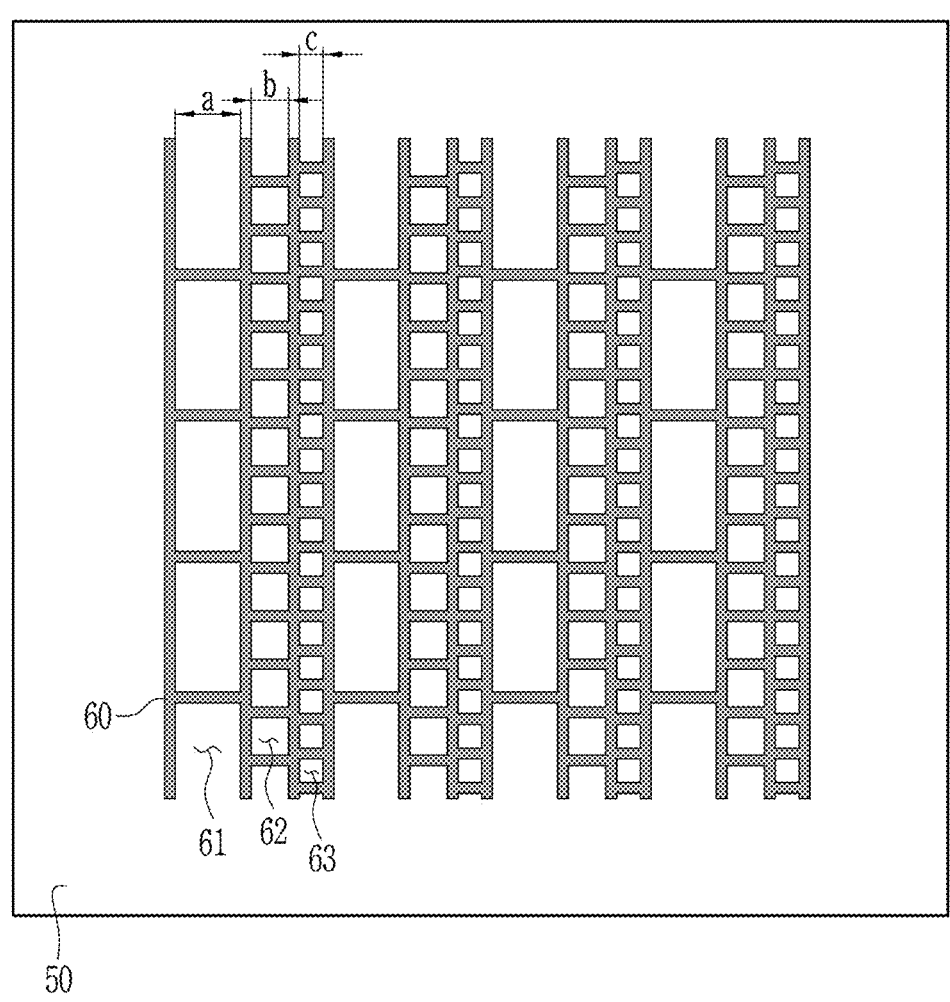
FIG. 11 is a plan view of a display panel including first to third pixel regions according to another embodiment of the present invention.
Figure 12:
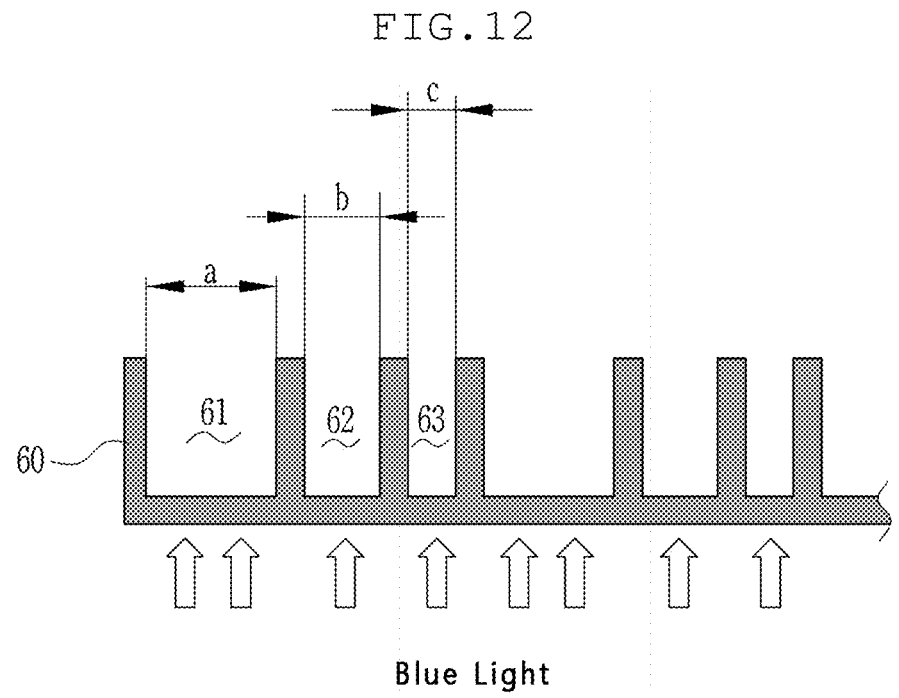
FIG. 12 is a sectional view of a display panel according to an embodiment of the present invention.
Figure 13:
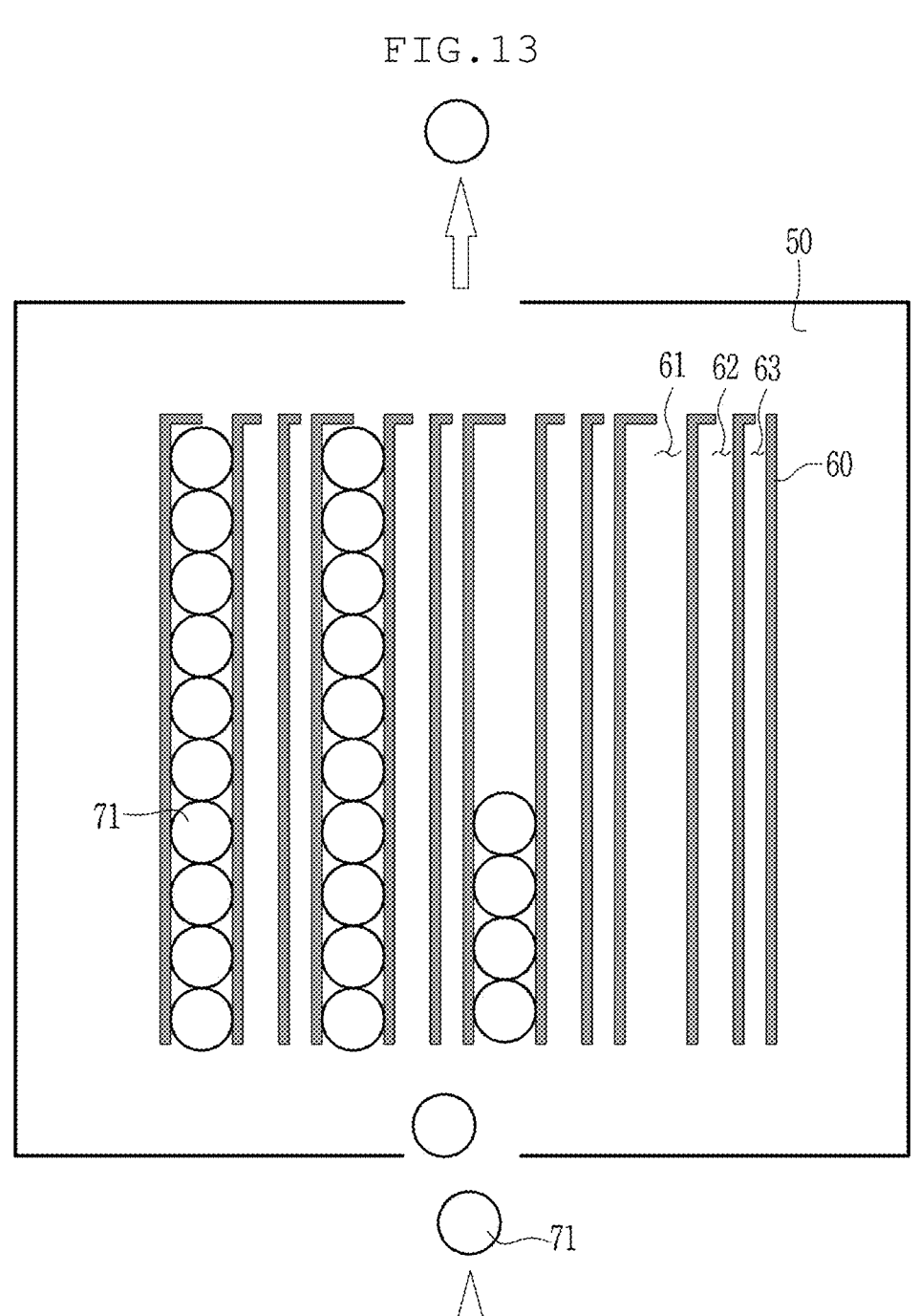
FIGS. 13 and 14 are schematic views of an arrangement on a color basis of microcapsules including quantum dots in accordance with an embodiment of the present invention.
Figure 14:
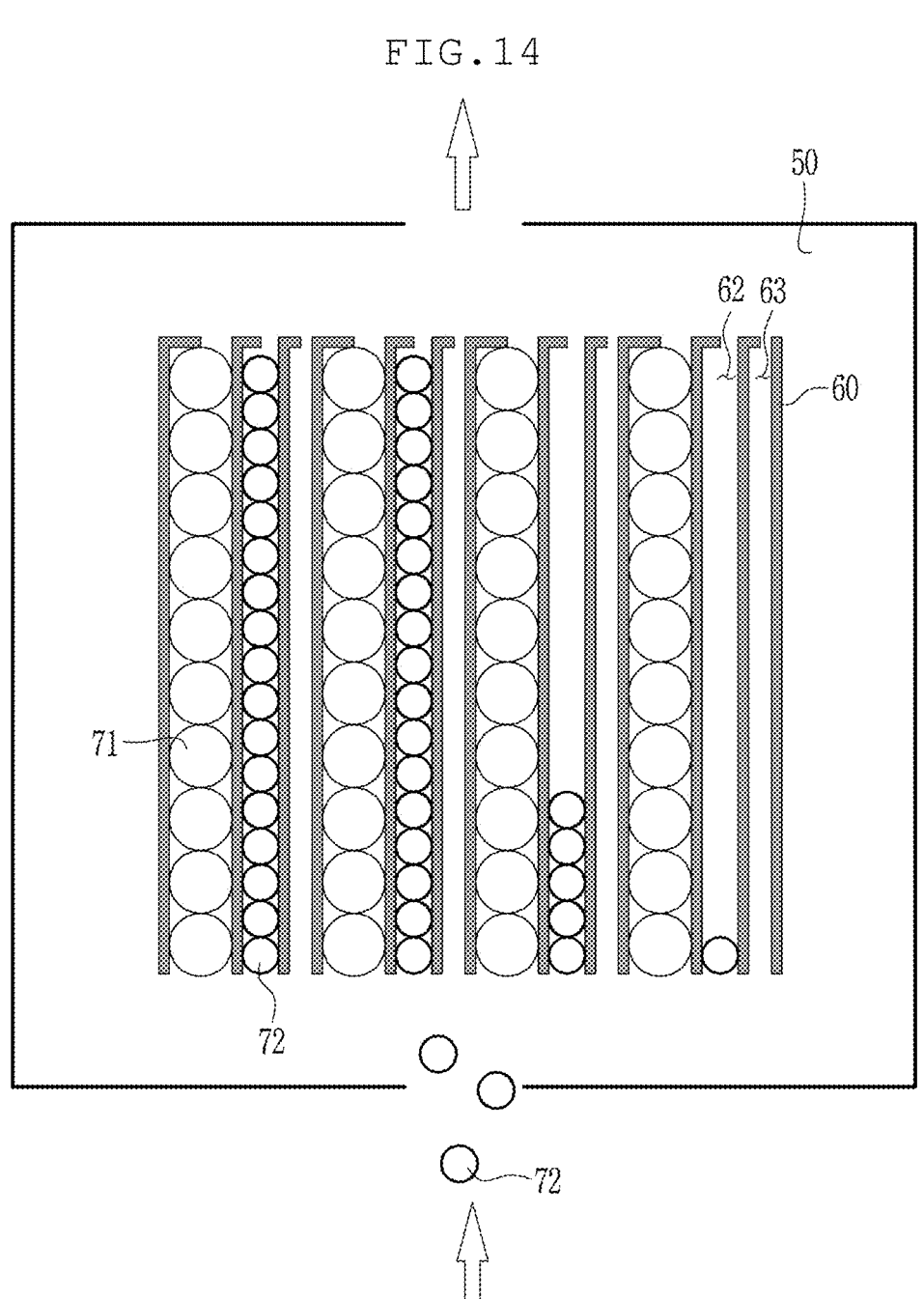
Figure 15:
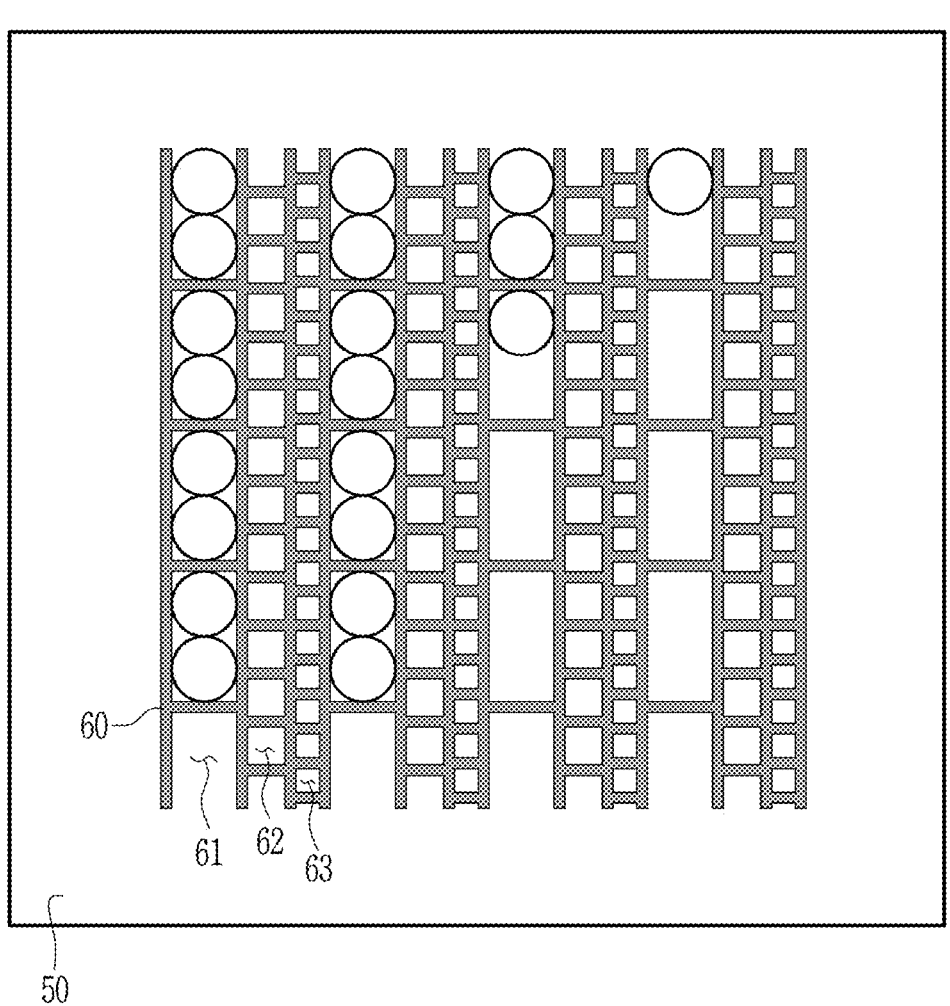
FIGS. 15 and 16 are schematic views of an arrangement on a color basis of microcapsules including quantum dots in accordance with another embodiment of the present invention.
Figure 16:
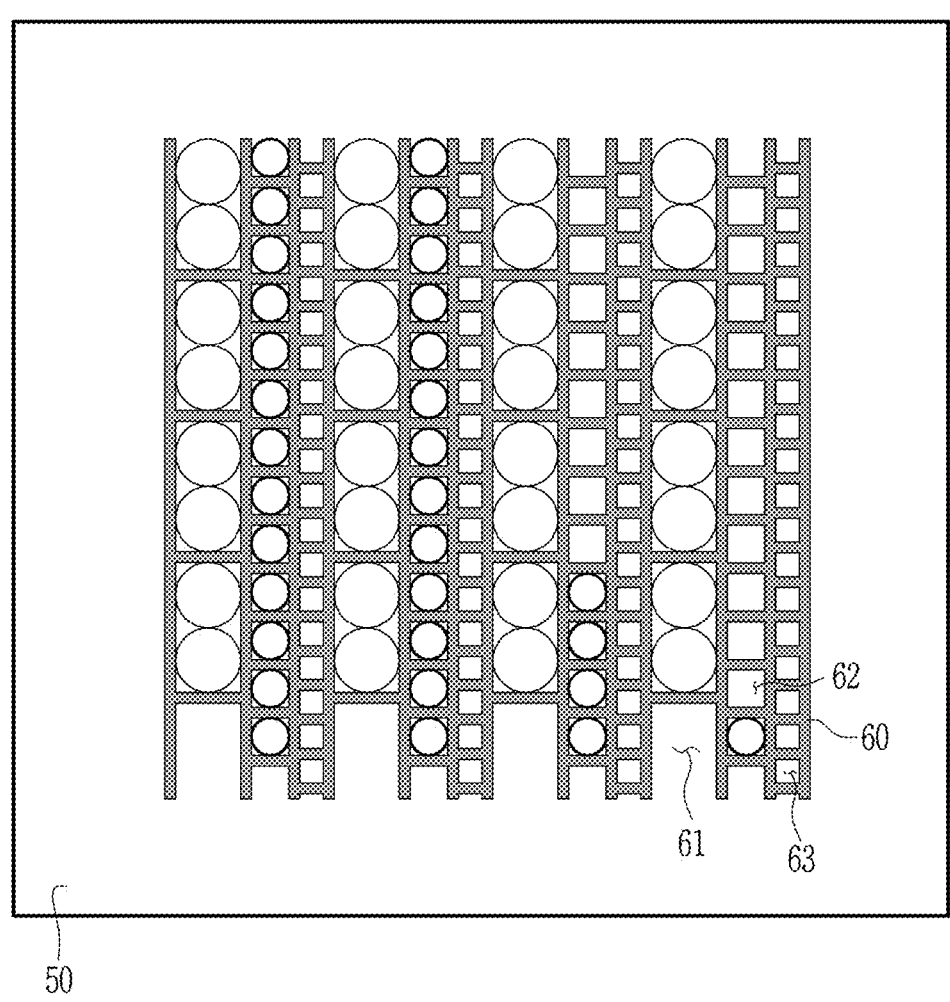

FIG. 10 is a plan view of a display panel including first to third pixel regions 61 to 63 according to an embodiment of the present invention. FIG. 11 is a plan view of a display panel including first to third pixel regions 61 to 63 according to another embodiment of the present invention. FIG. 12 is a sectional view of a display panel according to an embodiment of the present invention. FIGS. 13 and 14 are schematic views of an arrangement on a color basis of microcapsules 40 including quantum dots 10 in accordance with an embodiment of the present invention. FIGS. 15 and 16 are schematic views of an arrangement on a color basis of microcapsules 40 including quantum dots 10 in accordance with another embodiment of the present invention.

A display panel according to an embodiment of the present invention includes a base substrate 50, and separators 60 formed on the base substrate 50 to have a predetermined height and configured to define a first pixel region 61, a second pixel region 62 and a third pixel region 63, which are formed to emit light of red, green and blue wavelengths, respectively, while being spaced apart from one another by predetermined distances. When the predetermined distance between the separators 60 defining the first pixel region 61 is a, the predetermined distance between the separators 60 defining the second pixel region 62 is b, and the predetermined distance between the separators 60 defining the third pixel region 63 is c, the predetermined distances a, b, and c may be different from one another, and a quantum dot microcapsule of red light having a diameter corresponding to the predetermined distance a may be included in the first pixel region 61, and a quantum dot microcapsule of green light having a diameter corresponding to the predetermined distance b may be included in the second pixel region 62.

In the display panel shown in FIG. 10, a first pixel region 61, a second pixel region 62 and a third pixel region 63 for rendering of red, green and blue may be formed on a base substrate 50 by separators 60.

The first pixel region 61, the second pixel region 62 and the third pixel region 63 may be formed to have predetermined widths, respectively, while extending in a longitudinal direction, and may be repeatedly formed while being adjacent to one another. Accordingly, various colors may be rendered through the pixel regions 61 to 63.

As shown in FIGS. 10 and 12, in the display panel according to the embodiment of the present invention, pixel regions are physically separated from one another while having different widths, respectively, by the separators 60. In this case, quantum dot microcapsules respectively having diameters corresponding to different distances of the separators 60, that is, the different widths of the pixel regions, are manufactured.

For example, when the width in a shorter direction of the first pixel region 61 is a, a first microcapsule 71 including a quantum dot 10 to emit red light in the first pixel region 61 may be manufactured to have a diameter corresponding to the width a. Thus, the first microcapsule 71 may be naturally arranged in the first pixel region 61 on the display panel and, as such, arrangement of the first microcapsule 71 on a color basis may be naturally achieved.

In this case, when respective widths a, b and c of the first pixel region 61, the second pixel region 62 and the third pixel region 63 are different from one another, microcapsule arrangement on a color basis may be sequentially carried out by sequentially injecting microcapsules 40 into the pixel regions 61 to 63 in order of greater-width pixel regions, starting from the pixel region having the greatest width.

As shown in FIG. 13, the first microcapsule 71 is first injected into the first pixel region 61 having the greatest width a, and filling of the first pixel region 61 is completed through continued injection of the first microcapsule 71.

Thereafter, as shown in FIG. 14, a second microcapsule 72 having the same diameter as the next greatest width, that is, the width b of the second pixel region 62, is injected into the second pixel region 62. As such, an effect of sequentially arranging quantum dots 10 on a color basis may be obtained.

In this case, the third pixel region 63 is a region of blue light. In this case, it is unnecessary to fill a separate quantum dot microcapsule because the display panel generally uses blue light. Of course, even in this case, the third pixel region 63 may be formed such that the width c thereof is smallest in order to efficiently achieve arrangement on a color basis of different pixel regions.

In an embodiment of the present invention, in order to prevent degradation of color brightness, color rendering and light emission reliability of the display caused by relative differences of the widths of the first pixel region 61, the second pixel region 62 and the third pixel region 63, one or more pixel regions, which are identical to a pixel region having a smaller width, may be further provided in association with the pixel region having the smaller width.

FIG. 11 represents pixel regions of a display panel according to another embodiment of the present invention.

As shown in FIG. 11, a first pixel region 61 may be formed to have the form of a lattice having a shorter width a and a longer longitudinal width corresponding to a multiple of a, and may be formed such that the lattice is repeated in a longitudinal direction at least one time. A second pixel region 62 may be formed to be adjacent to the first pixel region 61 while having the form of a lattice having a shorter width b and a longer longitudinal width corresponding to a multiple of b, and may be formed such that the lattice is repeated in a longitudinal direction at least one time. A third pixel region 63 may be formed to be adjacent to the second pixel region 62 while having the form of a lattice having a shorter width c and a longer longitudinal width corresponding to a multiple of c, and may be formed such that the lattice is repeated in a longitudinal direction at least one time.

Even in this case, the sizes of the lattices should be different from one another, for arrangement of quantum dot microcapsules on a color basis. In this case, of course, a microcapsule 40 having a diameter corresponding to the pixel region having the greatest width may first be filled in the pixel region, and microcapsules 40 having smaller widths may then be sequentially filled in the pixel regions corresponding thereto.

However, in order to obtain a better filling density of the lattice-shaped pixel regions, it may be suitable that the longer longitudinal width be determined to be a multiple of the shorter width such that an integer number of microcapsules 40 may be filled.

For example, referring to FIGS. 15 and 16, it may be seen that each lattice of the first pixel region 61 may be filled with two microcapsules 71 having a diameter a in accordance with a design in which the first pixel region 61 has a shorter width a and a longer longitudinal width b corresponding to a double of a. The second pixel region 62 may be formed to have the form of a lattice with a width ratio of 1:1 and, as such, may accommodate one second microcapsule 72 per lattice.

Figure 17:
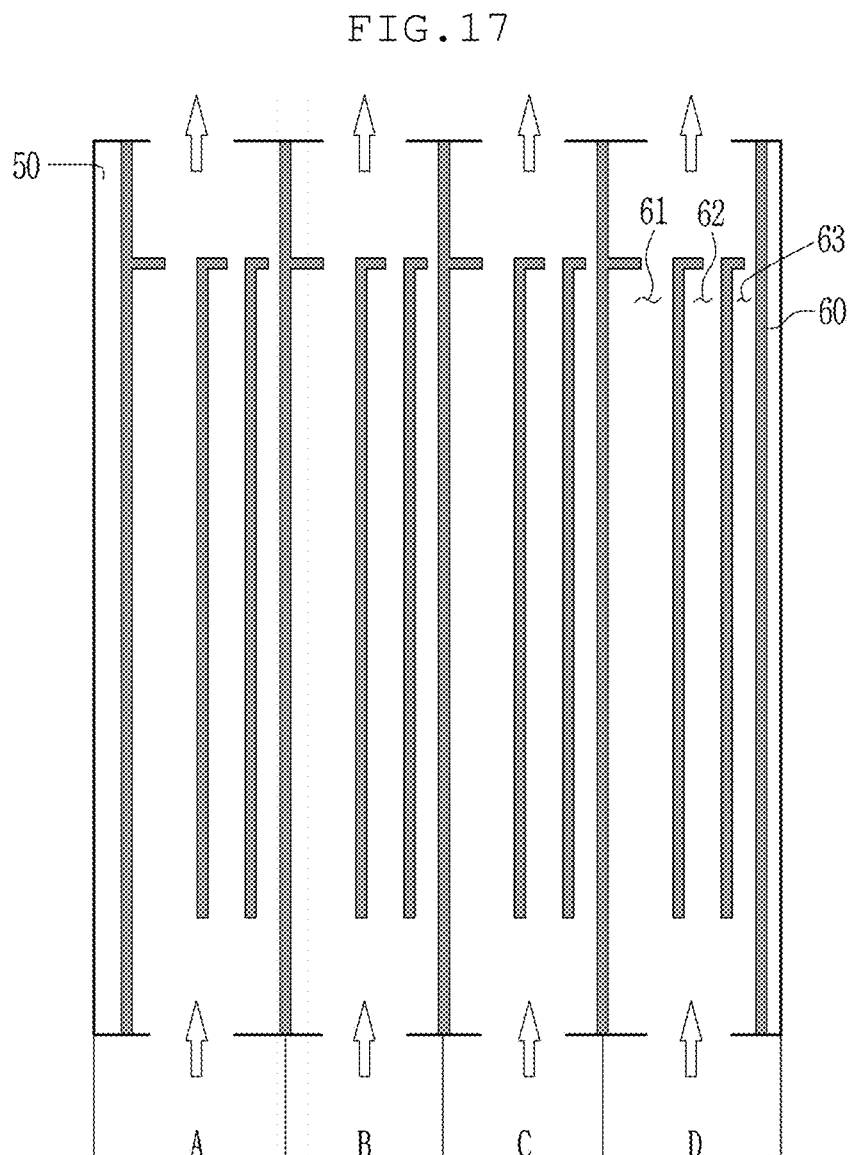
FIG. 17 is a plan view of a variant example of a display panel according to an embodiment of the present invention.
Figure 18:
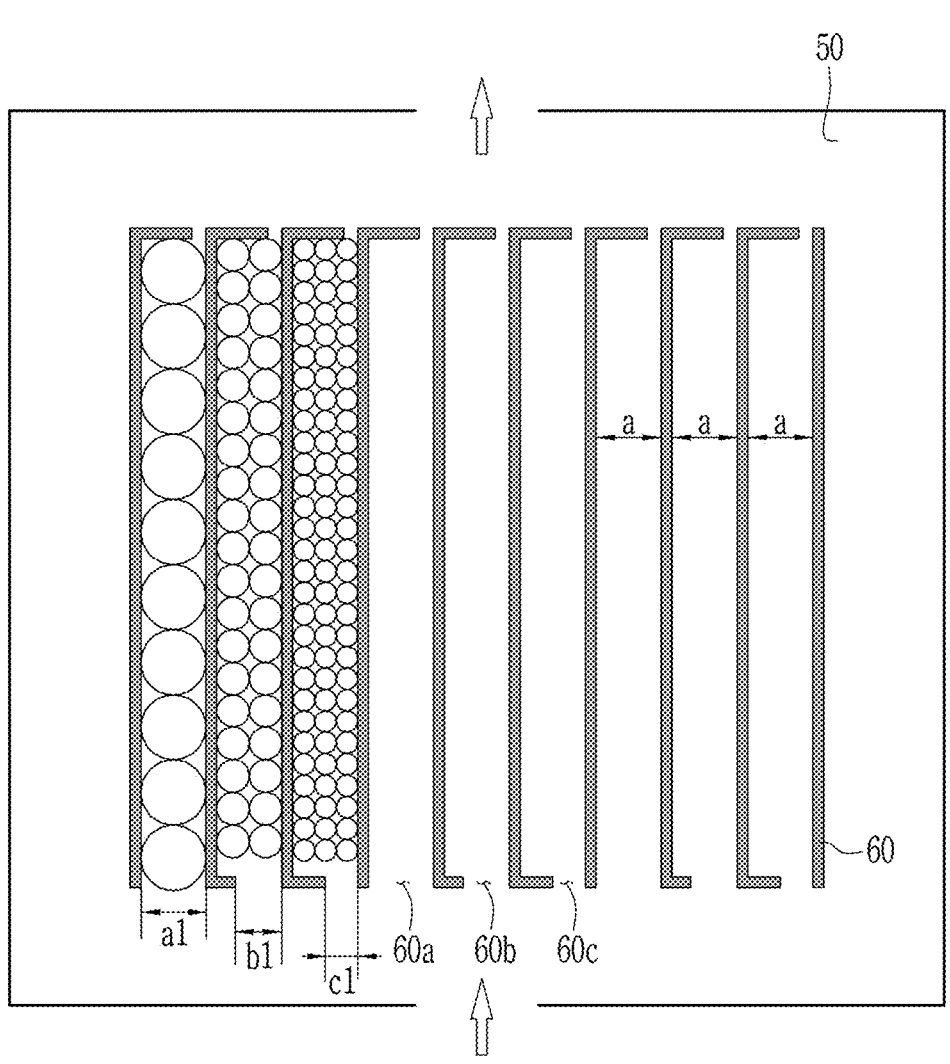
FIG. 18 is a plan view of a display panel according to another embodiment of the present invention.
Figure 19:
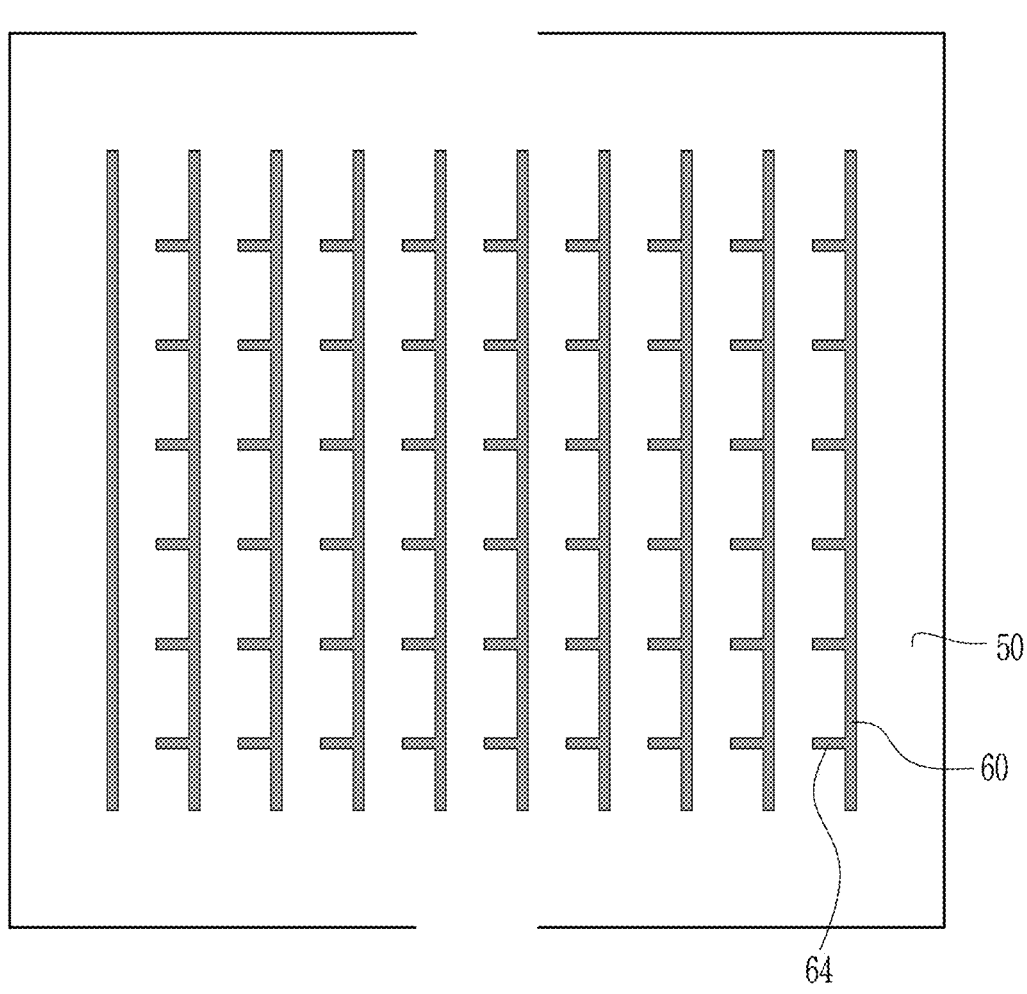
FIG. 19 is a plan view of a display panel according to another embodiment of the present invention.
Figure 20:
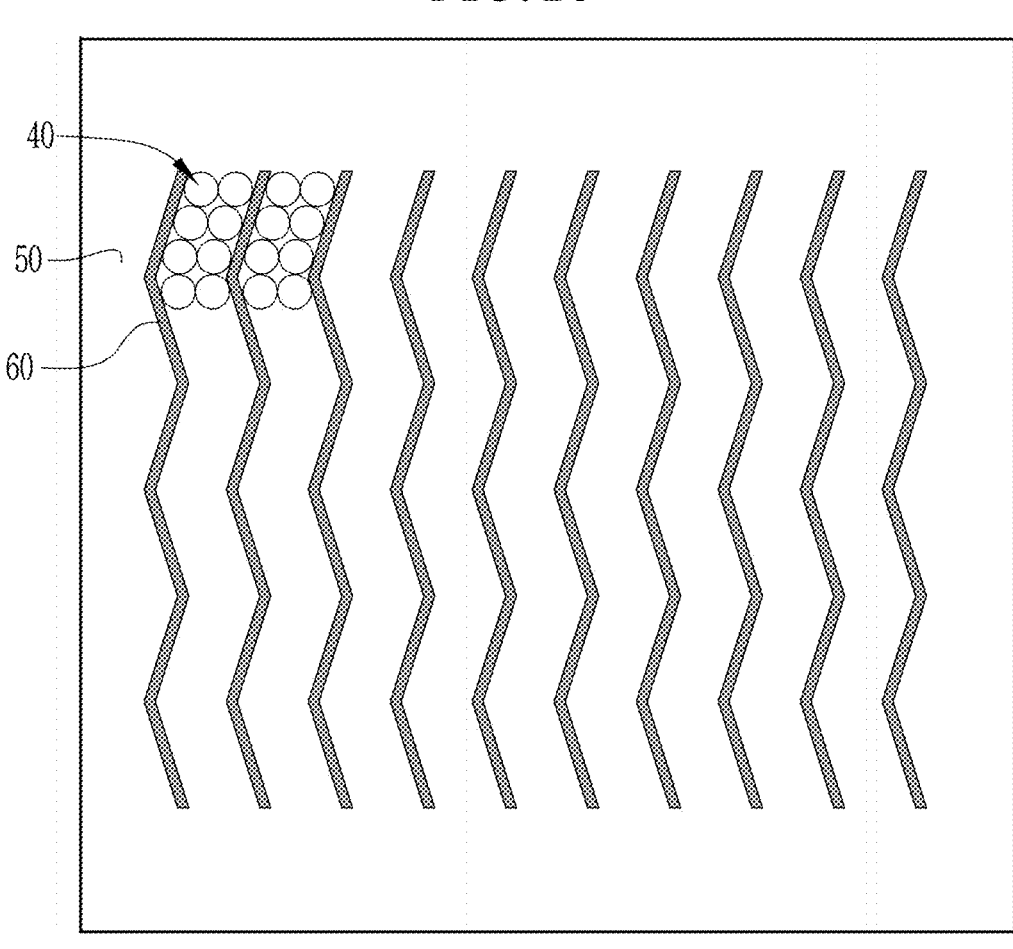
FIG. 20 is a plan view of a display panel according to a modified embodiment of the present invention.
Figure 21:
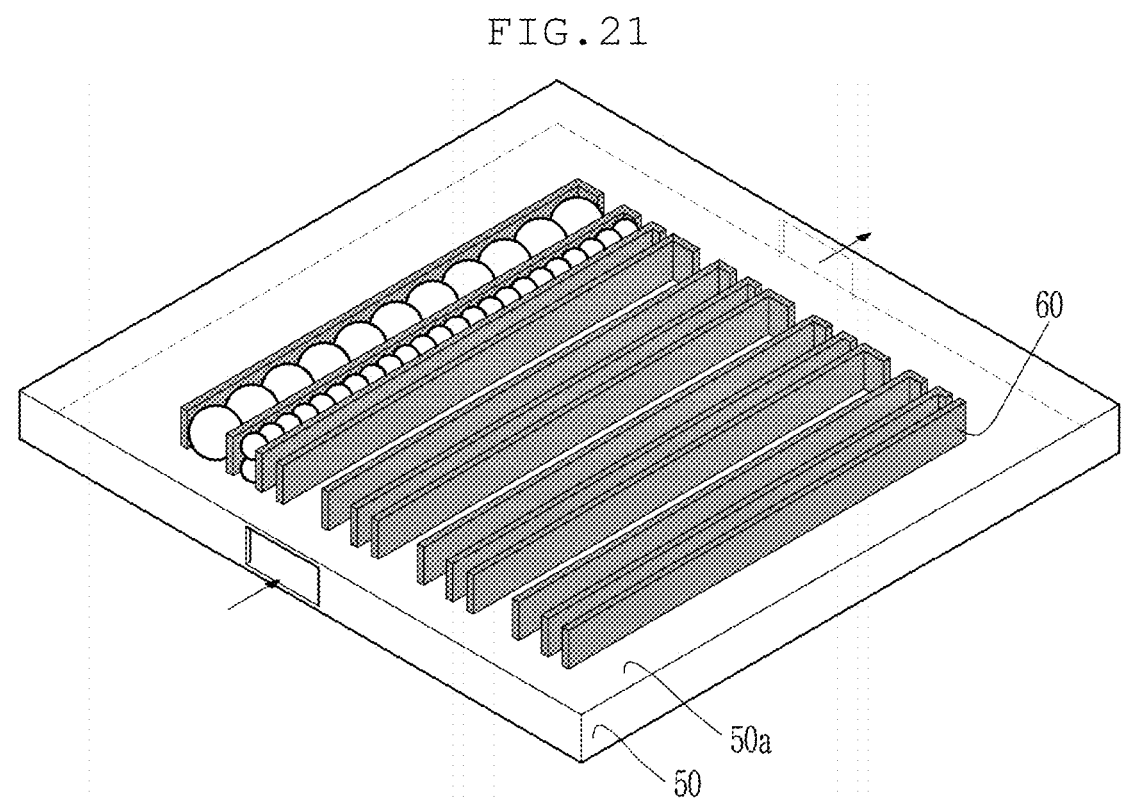
FIG. 21 is a perspective view of a display panel including an upper substrate according to an embodiment of the present invention.

FIG. 17 is a plan view of a variant example of a display panel according to an embodiment of the present invention. FIG. 18 is a plan view of a display panel according to another embodiment of the present invention. FIG. 19 is a plan view of a display panel according to another embodiment of the present invention. FIG. 20 is a plan view of a display panel according to a modified embodiment of the present invention. FIG. 21 is a perspective view of a display panel including an upper substrate according to an embodiment of the present invention.

As shown in FIG. 17, a display panel according to an embodiment of the present invention may be divided into areas A, B, C and D, each of which is a unit area including first to third pixel regions, in order to inject quantum dot microcapsules on an area basis. An outermost separator of each area may extend in a longitudinal direction to form boundaries defining separated regions. An injection portion and a discharge portion may be formed in the separated regions, respectively. Accordingly, it may be possible to inject quantum dot microcapsules on an area basis for individual areas A, B, C and D and, as such, it may be possible to manufacture and realize a display panel having enhanced reliability.

FIG. 18 is a plan view of a display panel according to another embodiment of the present invention.

The display panel according to this embodiment of the present invention includes a base substrate 50, and separators 60 formed to have a predetermined height and configured to define a first pixel region 61, a second pixel region 62 and a third pixel region 63, which are formed to emit color light of red, green and blue wavelengths, respectively, in a separated state while being spaced apart from one another by predetermined distances. The predetermined distance between the separators 60 defining the first pixel region 61, the predetermined distance between the separators 60 defining the second pixel region 62, and the predetermined distance between the separators 60 defining the third pixel region 63 are equal to a. An inlet portion 60a formed at one end of the first pixel region 61 has a width a1, an inlet portion 60b formed at one end of the second pixel region 62 has a width a2, an inlet portion 60c formed at one end of the third pixel region 63 has a width a3, and the widths a1, a2 and a3 are different from one another. A quantum dot microcapsule of red light having a diameter corresponding to the width a1 is included in the first pixel region 61, and a quantum dot microcapsule of green light having a diameter corresponding to the width b1 is included in the second pixel region 62.

In the case of FIG. 18, it may be possible to achieve an effective arrangement of quantum dot microcapsules on a color basis corresponding to sizes of the quantum dot microcapsules by not only forming an arrangement of the first pixel region 61, the second pixel region 62 and the third pixel region 63 of the display panel, which have a uniform width a, but also adjusting the widths of the inlet portions 60a, 60b and 60c at respective pixel regions 61, 62 and 63, which are respective injection portions of the pixel regions 61, 62 and 63, such that the widths are different from one another.

That is, under the condition that the width of the inlet portion 60a of the first pixel region 61 is adjusted to be a1, the width of the inlet portion 60b of the second pixel region 62 is adjusted to be b1, and the width of the inlet portion 60c of the third pixel region 63 is adjusted to be c1, it may be possible to sequentially fill the first pixel region 61 and the second pixel region 62 with the quantum dot microcapsules by injecting the quantum dot microcapsules into the inlet portions in order of greater-width inlet portions, starting from the greatest-width inlet portion. A sequential arrangement on a color basis may be formed through injection of the quantum dot microcapsules starting from the quantum dot microcapsule having the diameter corresponding to the pixel region having the greatest width.

FIG. 19 is a plan view of a display panel according to another embodiment of the present invention. In this case, the display panel may further include inner separators 64 protruding from a separator toward an inside of a pixel region while being spaced apart from one another by a predetermined distance.

The inner separators 64 may be formed to be spaced apart from one another by a uniform distance in a longitudinal direction of the pixel region, and may be formed to protrude inwards to an extent not blocking the pixel region in the longitudinal direction.

The inner separators 64 may function to prevent light leakage among pixels of the display panel. Accordingly, it may be desirable that the entirety of the separator including the inner separators 64 be formed to be black.

Each inner separator 64 may be suitably formed to have a smaller length than a predetermined width of the pixel region and, as such, not to block a flow of microcapsules injected into a channel. In addition, the spacing of the inner separator 64 may be suitably adjusted to correspond to the diameter of the quantum dot microcapsule to be injected.

In addition, referring to FIG. 19, it may be seen that one or more inner separators 64 are arranged in the longitudinal direction of each pixel region at uniform spacing. Of course, the spacing or the inward protrusion length of the inner separator 64 may be suitably adjusted in accordance with color characteristics of the display panel.

FIG. 20 is a schematic view showing an example of a modified structure of a separator of a display panel according to an embodiment of the present invention. Since quantum dots in a liquid phase state may be injected through utilization of quantum dot microcapsules, this structure may effectively cope with realization of a pixel region having a zig-zag shape or various other shapes.

Description of other detailed configurations of the display panel and the microcapsule overlaps with that of the display panel according to the above-described embodiments of the present invention and, as such, may be omitted.

FIG. 21 is a perspective view of a display panel further including an upper substrate in accordance with an embodiment of the present invention.

The display panel according to this embodiment of the present invention is formed to include separators 60 defining a first pixel region 61, a second pixel region 62 and a third pixel region 63 on a base substrate 50. As shown in FIG. 21, the display panel may further include an upper substrate 50a.

In the case in which the upper substrate 50a is coupled to the base substrate 50, it is desirable that the separators 60 be formed to have a height at least greater than a predetermined distance between the separators 60. In this case, it may be possible to effectively cope with adjustment of diameters of quantum dot microcapsules and, as such, to achieve injection of the quantum dot microcapsules into each pixel region.

In addition, as shown in FIG. 21, it is desirable that lateral portions of the display panel, except for an injection portion and a discharge portion, be covered and sealed. Of course, such a structure may be suitably varied in accordance with the structure and device of the display panel.

As is apparent from the above description, in accordance with the embodiments of the present invention, there are effects capable of not only effectively adjusting a density of quantum dots through formation of a microcapsule formed to include one or more quantum dots and filled with an oil, but also effectively protecting ligands of the quantum dots from an environment such as oxygen, moisture or the like, against which the ligands are weak.

In addition, there is an effect capable of effectively controlling an amount of quantum dots filling a microcapsule through control of the size of the quantum dots included in the microcapsule and the size of the microcapsule.

Furthermore, there is an effect capable of achieving an arrangement of quantum dots on a color basis through both control of the size of a microcapsule and control of the size of a pixel region of a display panel filled with the quantum dots.

In addition, there is an effect capable of embodying various quantum dot color conversion layers in a limited space of a pixel region through control of the size of a microcapsule including quantum dots and the number of the quantum dots.

Furthermore, at least one quantum dot may be included in a microcapsule filled with an oil and, as such, a quantum dot color conversion layer using a quantum dot may be embodied in a liquid phase. Accordingly, there is an effect capable of achieving an enhancement in color conversion performance and an enhancement in stability of the quantum dot color conversion layer.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A quantum dot microcapsule comprising:
one or more quantum dots each comprising a ligand coupled to an outer circumferential surface thereof, the ligand being made of an organic material;
a microcapsule enclosing the one or more quantum dots; and
an oil or a solvent enclosed within the microcapsule with the quantum dots dispersed in the oil or the solvent,
wherein an outer wall of the microcapsule is made of a light-transmissive polymer material, and comprises one or a combination of two or more of acacia gum, alginate, gelatin, ethyl cellulose, poly(vinyl pyridine), polystyrene, and methylmethacrylate.

2. The quantum dot microcapsule according to claim 1, wherein each of the one or more quantum dots comprises:
a core;
a first shell disposed to surround the core;
a second shell disposed to surround the first shell; and
the ligand disposed at an outer circumferential surface of the second shell.

3. The quantum dot microcapsule according to claim 1, wherein each of the quantum dots is a nanocrystal particle of a perovskite, and the perovskite is formed of one of $CaTiO_3$, $BaTiO_3$, or a combination thereof.

4. A display panel comprising:
a base substrate;
separators formed on the base substrate to have a predetermined height and configured to define a first pixel region, a second pixel region and a third pixel region respectively formed to emit light of red, green and blue wavelengths in a separated state, while being spaced apart from one another by predetermined distances,
wherein, when the predetermined distance between the separators defining the first pixel region is a, the predetermined distance between the separators defining the second pixel region is b, and the predetermined distance between the separators defining the third pixel region is c,:
the predetermined distances a, b, and c are different from one another;
a first quantum dot microcapsule emitting red light having a diameter corresponding to the predetermined distance a is included in the first pixel region; and
a second quantum dot microcapsule emitting green light having a diameter corresponding to the predetermined distance b is included in the second pixel region,
wherein each of the first quantum dot microcapsule and the second quantum dot microcapsule respectively comprising:

one or more quantum dots each comprising a ligand coupled to an outer circumferential surface thereof, the ligand being made of an organic material;
a microcapsule enclosing the one or more quantum dots; and
an oil or a solvent enclosed within the microcapsule with the quantum dots dispersed in the oil or the solvent,
wherein an outer wall of the microcapsule is made of a light-transmissive polymer material, and comprises one or a combination of two or more of acacia gum, alginate, gelatin, ethyl cellulose, poly(vinyl pyridine), polystyrene, and methylmethacrylate.

5. The display panel according to claim 4, wherein:
the first pixel region extends in a longitudinal direction while having a width corresponding to the predetermined distance a;
the second pixel region is adjacent to the first pixel region and extends in a longitudinal direction while having a width corresponding to the predetermined distance b;
the third pixel region is adjacent to the second pixel region and extends in a longitudinal direction while having a width corresponding to the predetermined distance c; and
when the predetermined distances a, b, and c have a relation of a>b>c, the second pixel region or the third pixel region comprises at least two identical pixel regions.

6. The display panel according to claim 4, wherein:
the first pixel region is formed to have a form of a lattice having a shorter width a and a longer longitudinal width corresponding to a multiple of a, and is formed such that the lattice thereof is repeated in a longitudinal direction at least one time;
a second pixel region is formed to be adjacent to the first pixel region while having a form of a lattice having a shorter width b and a longer longitudinal width corresponding to a multiple of b, and is formed such that the lattice thereof is repeated in a longitudinal direction at least one time;
a third pixel region is formed to be adjacent to the second pixel region while having a form of a lattice having a shorter width c and a longer longitudinal width corresponding to a multiple of c, and is formed such that the lattice thereof is repeated in a longitudinal direction at least one time;
the first quantum dot microcapsule emitting red light having a diameter corresponding to the predetermined distance a is included in the first pixel region; and
the second quantum dot microcapsule emitting green light having a diameter corresponding to the predetermined distance b is included in the second pixel region.

7. A display panel comprising:
a base substrate;
separators formed on the base substrate to have a predetermined height and configured to define a first pixel region, a second pixel region and a third pixel region respectively formed to emit light of red, green and blue wavelengths in a separated state, while being spaced apart from one another by predetermined distances,
wherein the predetermined distance between the separators defining the first pixel region, the predetermined distance between the separators defining the second pixel region, and the predetermined distance between the separators defining the third pixel region are equal to a,
wherein an inlet portion formed at one end of the first pixel region has a width a1, an inlet portion formed at one end of the second pixel region has a width a2, and an inlet portion formed at one end of the third pixel region has a width a3, wherein the widths a1, a2 and a3 are different from one another, wherein a first quantum dot microcapsule emitting red light having a diameter corresponding to the width a1 is included in the first pixel region, and wherein a second quantum dot microcapsule emitting green light having a diameter corresponding to the width b1 is included in the second pixel region, wherein each of the first quantum dot microcapsule and the second quantum dot microcapsule respectively comprising:

one or more quantum dots each comprising a ligand coupled to an outer circumferential surface thereof, the ligand being made of an organic material;

a microcapsule enclosing the one or more quantum dots; and an oil or a solvent enclosed within the microcapsule with the quantum dots dispersed in the oil or the solvent, wherein an outer wall of the microcapsule is made of a light-transmissive polymer material, and comprises one or a combination of two or more of acacia gum, alginate, gelatin, ethyl cellulose, poly(vinyl pyridine), polystyrene, and methylmethacrylate.

*   *   *   *   *